(12) United States Patent
Achenbach (10) Patent No.: US 8,783,790 B2
(45) Date of Patent: Jul. 22, 2014

(54) AXLE SYSTEM FOR A TWO-WHEELED VEHICLE

(75) Inventor: Martin Achenbach, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 442 days.

(21) Appl. No.: 13/161,285

(22) Filed: Jun. 15, 2011

(65) Prior Publication Data

US 2011/0309671 A1  Dec. 22, 2011

(30) Foreign Application Priority Data

Jun. 21, 2010 (DE) .......................... 10 2010 024 474

(51) Int. Cl.
*B62K 25/02* (2006.01)
*B60B 35/00* (2006.01)

(52) U.S. Cl.
USPC .................................... 301/124.2; 403/322.4

(58) Field of Classification Search
CPC .................................................... B60B 27/026
USPC .................... 301/110.5, 124.2; 280/279, 280;
403/322.4, 374.1, 374.2, 374.3, 374.4, 403/374.5
See application file for complete search history.

(56) References Cited

U.S. PATENT DOCUMENTS

| | | | | |
|---|---|---|---|---|
| 4,079,958 A * | 3/1978 | Segawa | .......................... | 280/279 |
| 4,598,614 A * | 7/1986 | Kipp | ............................... | 81/58.3 |
| 7,055,220 B2 * | 6/2006 | Bertani | ........................... | 16/436 |
| 7,351,000 B2 * | 4/2008 | Meggiolan | ................. | 403/322.4 |
| 7,665,928 B2 * | 2/2010 | Winefordner et al. | ..... | 403/322.4 |
| 8,075,010 B2 * | 12/2011 | Talavasek et al. | ............. | 280/288 |
| 2007/0154286 A1 * | 7/2007 | Spahr | ........................... | 411/402 |
| 2008/0191545 A1 | 8/2008 | Laird | | |
| 2008/0211295 A1 * | 9/2008 | Bartlett et al. | ............. | 301/124.2 |

FOREIGN PATENT DOCUMENTS

| | | |
|---|---|---|
| EP | 1801005 | 11/2008 |
| EP | 2110299 | 10/2009 |
| WO | WO 2005/120940 | 12/2005 |

OTHER PUBLICATIONS

German Office Action from the German Patent Office in the corresponding priority application 10 2010 024 474.0.

* cited by examiner

*Primary Examiner* — Kip T Kotter
*Assistant Examiner* — Jean Charleston
(74) *Attorney, Agent, or Firm* — Greer, Burns & Crain, Ltd.

(57) ABSTRACT

An axle system, and a two-wheeler component with a first dropout and a second dropout and an axle system with an axle for receiving a wheel of a two-wheeler, wherein a clamping mechanism with a tightening device and an end device is provided and equipped to clampingly attach the axle received at the dropouts between the tightening device and the end device. The clamping force is independent of a possibly possible rotary movement of the axle.

23 Claims, 4 Drawing Sheets

AXLE SYSTEM FOR A TWO-WHEELED VEHICLE

BACKGROUND

The present invention relates to an axle system for a two-wheeled vehicle and in particular for a bicycle operated by muscular energy at least in part. The bicycle may be provided with an auxiliary motor drive configured in particular as an electric motor to assist the rider if and as desired. Use is likewise conceivable with other bi- and multicycles.

Various axle systems with a quick release mechanism have become known in the prior art to allow fast and easy mounting and demounting of bicycle wheels.

In many of the quick releases for bicycles as known in the prior art the clamping force is applied by flipping an eccentric member after adapting the clamping length by means of a tightening nut and a stopper. The drawback of this system is that first the clamping length must be set by means of the tightening nut before the clamping length and the clamping force can be checked by flipping the eccentric member. As a rule a number of cycles is required until the proper clamping length and thus the clamping force are suitable.

Due to safety requirements for quick releases the dropouts of modern bicycles tend to be configured not smooth but comprising end bearings for the axle system so as to initially ensure continued safe accommodation of the axle system at the dropouts even after releasing the clamping force. Because of these end bearings or lugs at the dropouts the opened distance must be enlarged wherein the stroke length of a classic quick release lever obtained by flipping the eccentric member is not always sufficient to release the clamping force and to overcome the additionally required lift for overcoming the additional end bearings. Therefore many systems require to operate not only the quick release lever but also to turn the screw nut on the opposite side in the opening direction for removing the wheel every time that a wheel is released and later clamped. Thus the axle system must be adjusted with every wheel change.

In EP 1 801 005 B1 a quick release in particular for bicycles has become known offering greater ease of operation. In this quick release the clamping force is not applied by flipping an eccentric member but via a screwed connection. A spring mechanism allows to pull the operating lever axially outwardly out of engagement and to freely turn it back in to quickly tighten the quick release. The known system operates reliably and allows precise adjustment of the clamping force required. Moreover the operating lever may be rotated to any desired direction after setting the clamping force.

Due to safety requirements and the increased opened distance which may be for example 5 mm, the quick release lever must be rotated approximately 5 or 6 turns every time that a wheel is released and later clamped, before the wheel can be removed or is again reliably clamped.

SUMMARY

Against the cited prior art it is the object of the present invention to provide an axle system allowing greater ease of operation and possibly faster wheel changes.

An axle system according to the invention comprises an axle for receiving a wheel of a two-wheeled vehicle and is provided with at least one clamping mechanism with at least one tightening device and at least one end device. The at least one clamping mechanism is equipped and provided to clampingly attach a wheel to a two-wheeler component between the tightening device and the end device. The clamping force is independent of a possible rotary movement of the axle.

The axle system according to the invention has many advantages. One considerable advantage of the axle system according to the invention consists in the high operational comfort. The clamping force is independent of a possibly possible rotary movement of the axle. One-hand operation is possible since operation is only possible from one side of the axle system. Holding the axle on the other side is not required since transmission of a rotary movement of the axle or rotational force to the axle is not required.

In another configuration the axle system according to the invention comprises an axle for receiving a wheel of a two-wheeled vehicle and at least one clamping mechanism with at least one tightening device and at least one end device. The clamping mechanism is equipped and provided to clampingly attach a wheel to a two-wheeler component between the tightening device and the end device. The tightening device receives at least part of a coupling device which is suitable for coupling the axle with the tightening device. The coupling device is free to rotate relative to the tightening device and/or relative to the axle without affecting the clamping force as the coupling device rotates. This means in one configuration that the coupling device is rotatably received at the tightening device without involving any change in the clamping force as the coupling device rotates relative to the tightening device. In the other configuration the coupling device may be non-rotatably received at the tightening device while it is provided to be rotatable relative to the axle. In both these variants the axle may be rotatably or non-rotatably disposed at the axle system or a wheel component. The axle may for example be form-fittingly or frictionally disposed at a dropout of a two-wheeler component.

Since in all of the configurations the axle does not, or does not need to, transmit any significant rotational force it is not relevant whether the axle is provided to rotate freely at the axle system or at the two-wheeler component.

Preferably an operating lever is provided for adjusting the clamping force. Particularly preferably the operating lever as well as the tightening device are disposed at a first end portion of the axle the end device is provided at a second end portion of the axle. It is possible and preferred for the operating lever with the tightening device to remain at the two-wheeler component when a wheel is removed. With removal the axle system is then divided in two.

Preferably at least part of the tightening device is rotatable relative to the axle. In particular is the rotatable part of the tightening device rotatable for tightening about a central axis that is at least parallel to the axle. The rotatable part of the tightening device may be provided symmetrical around the axle.

The operating lever may include an eccentric member.

Preferably the coupling device is connected with the tightening device which is movable between an engagement position and a release position and which in the engagement position frictionally and in particular form-fittingly retains at least one coupling piece of the axle and which in the release position releases the coupling piece.

Another axle system according to the invention is in particular provided for a bicycle and comprises at least one axle for receiving a wheel of a two-wheeled vehicle. The axle system comprises a clamping mechanism with at least one tightening device and at least one end device wherein the at least one clamping mechanism is equipped and provided to clampingly attach a wheel to a two-wheeler component between the tightening device and the end device. The tightening device receives a coupling device which is movable between an engagement position and a release position. In the engagement position the coupling device form-fittingly retains at least one coupling piece of the axle. In the release position the coupling device releases the coupling piece.

The axle system according to the invention has many advantages. One considerable advantage of the axle system according to the invention consists in the high operational comfort. The coupling device form-fittingly retaining the coupling piece of the axle is very advantageous since a simple movement from the engagement position to the release position and vice versa releases or form-fittingly receives the coupling piece. Such movement which is very simple to do allows considerably increased operational comfort and faster wheel changes since multiple turns of a quick release are not required.

In a preferred more specific embodiment of the axle system according to the invention the tightening device comprises an externally threaded tightening bush at which the coupling device is received. The rotary movement of the tightening bush causes axial displacement of the tightening bush and thus also axial displacement of the coupling device to clampingly fasten or release the two-wheeler component. Transferring the coupling device from the release position to the engagement position establishes a form-fitting connection of the coupling piece of the axle with the coupling device of the tightening device which when the form-fitting connection has been established can very quickly and easily be brought to the desired tightening force by rotating the tightening bush for example one half turn for slight axial displacement. Unlike this, the prior art provides for overcoming considerably larger distances by axial movement requiring multiple turns of the quick release lever.

In particular is the tightening device provided to be attached to a dropout of a bicycle component. The tightening device may for example be disposed firmly while in particular being releasable at a bicycle fork or a frame such that in the case of a wheel change the tightening device remains at the bicycle component. This configuration allows pre-setting the required distances at the tightening device so as to require only very slight axial movements of the tightening bush in wheel changes to securely receive a wheel at the bicycle component.

Preferably the tightening bush comprises an external thread provided for engaging in an internal thread provided at the dropout. Preferably the internal thread is provided at a bush inserted in the dropout of the wheel component. The bush is in particular firmly inserted in the dropout where it may be glued in such that the internal thread with the bush can be exchanged in the case of defects.

Or else it is conceivable to provide the thread in the dropout directly.

In an advantageous configuration the tightening bush is connected with an operating lever for tightening and releasing. The operating lever is in particular configured as a quick release lever and may be provided to be rotatable around a central axis of the tightening bush.

Typical bicycle hub axles are approximately 5 mm in diameter. Furthermore there exist through axles for example 9 mm in diameter. Since in the presently proposed axle system the tightening device preferably remains as a wheel of the bicycle component is exchanged and since the operating lever is preferably provided at the tightening device, the external diameter of the external thread of the tightening device may be designed considerably larger than in conventional axle systems where a nut is screwed onto the axle end to apply the clamping force required. The considerably larger external diameter of the external thread of the tightening bush allows a larger thread pitch per rotation such that for example a half or a full turn of the operating lever allows to overcome an axial distance of 1, 2, or even 3 mm. This means that one fourth or one half or one full rotation may suffice for applying sufficient clamping force to a received wheel. The prior art, however, requires multiple turns for applying sufficient clamping force.

With the proposed axle system one half turn may be sufficient for applying or releasing the clamping force. Subsequently the coupling device is moved from the engagement position to the release position and the coupling piece of the axle is released by the tightening device so as to allow removing a wheel from the bicycle component. This sequence of movements represents high operational comfort causing considerably reduced efforts over the prior art. Furthermore high security is achieved since two different movements are required independent from one another for releasing the wheel at a wheel component. For one, the operating lever must be turned back far enough until the clamping force is reduced and for another the coupling device must be transferred from engagement position to the release position. To this end, a simple, linear movement is sufficient in an advantageous embodiment.

Conversely, the efforts required in mounting is also considerably reduced versus the prior art. For mounting, the wheel with the proposed axle system is brought to the bicycle component with the tightening system already mounted to a dropout of the bicycle component. The coupling device is then transferred from the release position to the engagement position in which the coupling piece of the axle and thus the entire axle is form-fittingly connected with the tightening device. Subsequently only the tightening bush of the tightening device must be axially displaced by the operating lever far enough for the clamping force to be sufficient. Since the distances can be predetermined and pre-set because the tightening device remains at the bicycle component, the efforts required therefor are very small.

In the engagement position the coupling device surrounds the coupling piece preferably entirely or at least largely. In this way a simple movement of the coupling device form-fittingly retains the coupling piece.

Preferably the coupling device comprises at least one engagement component which in transfer from the engagement position to the release position is relocated radially outwardly. Such movement may, other than radial movement, also comprise movement components in the peripheral direction. It is only substantial that in this preferred embodiment the engagement component is radially farther outwardly in the release position than in the engagement position. In the transfer back from the release position to the engagement position the movement is preferably reversed. Or else it is conceivable to employ a different type of movement for bringing the engagement component from radially farther outwardly back to radially inwardly.

It is for example possible for an engagement component to comprise a U-shaped or fork-like element which largely encircles the coupling piece or which engages in corresponding receiving bores or corresponding receiving openings of the coupling piece to achieve a form-fitting connection with the coupling piece.

In a particularly preferred configuration the coupling device comprises a plurality of engagement components provided distributed in particular symmetrically around a central axis. Two, three or four or more engagement components may for example be provided which in the engagement position are arranged around the coupling piece in particular symmetrically, form-fittingly encircling the coupling piece. With transferring the coupling device from the engagement position to the release position the engagement components are then moved radially outwardly and release a passage in their center releasing the coupling piece and allowing axial displacement of the coupling piece.

The engagement components of the coupling device are preferably preloaded and in particular biased radially inwardly by a preloading device. An elastic spring may for example encircle the engagement components outside such that the engagement components are preloaded toward the engagement position provided radially inwardly. In transferring the engagement components of the coupling device to the radially larger release position the engagement components are moved outwardly against the force of the preloading device.

Advantageously the tightening device comprises a decoupling device by means of which the coupling device can be transferred at least from the engagement position to the release position. The decoupling device is in particular transferred from the engagement position to the release position by way of linear displacement. Or else a rotary movement of the decoupling device is possible to transfer the coupling device from the engagement position to the release position.

In a particularly preferred configuration the decoupling device comprises a cone-shaped element or a cone-shaped region which for transferring the coupling device from the engagement position to the release position interacts with a tubular element of the coupling device. To this end, the cone-shaped region of the decoupling device is aligned coaxially with the tubular element of the coupling device. An axial displacement of the cone-shaped element of the decoupling device onto the tubular element of the coupling device causes expansion of the tubular element of the coupling device such that the individual engagement components of the coupling device are moved radially outwardly. In this way the form-fit of the coupling device with the coupling piece of the axle is disengaged and thus the coupling device is transferred to the release position.

By way of a very simple and possibly very short axial movement this configuration causes disengagement of the engaged state of the coupling device and release of the coupling portion after reducing the clamping force by rotating the tightening axle.

While the decoupling device may be different in configuration it is in particular suitable to displace the engagement components of the coupling device radially outwardly.

The decoupling device is preferably provided to be axially displaceable from a home position to a decoupling position and further to a release position. In the home position the decoupling device is disengaged from the coupling device. By way of transferring the decoupling device from the home position to the decoupling position the coupling device is transferred from the engagement position to the release position and the coupling piece of the axle is released. Further axial displacement of the decoupling device to the release position preferably causes the coupling piece with the axle to be axially displaced in the direction of the side of the end piece. Thus the coupling piece is moved out of the tightening device so as to release the wheel or the axle system.

Other than by linear, axial movement such function is possible via rotary movement in which the decoupling device is moved by way of rotary movement from a home position to a decoupling position and further to a release position. A different arrangement of the positions is likewise possible, providing the decoupling position at one side of the home position and the release position at the other side of the home position.

In all of the configurations it is preferred for the decoupling device to be preloaded to the home position. Then the decoupling device will be transferred back to the home position for example after removing a wheel.

The decoupling device is preferably suitable to axially displace the coupling piece of the axle in transfer from the decoupling position to the release position while activating a preloading device of the end device to thus cause the axle with the coupling piece to be automatically pulled out further on the tightening device. The preloading device may for example be activated by way of pushing a spring washer limiting the preloading spring over a thickened axle section to thus allow the preloading device to expand and thus to pull the end piece of the end device and consequently the axle towards the side of the end device. In this way the coupling piece is pulled out of the tightening device.

The end device may comprise a pusher as the end piece with which the axle with the coupling piece can be inserted in the tightening device counter to the force of the preloading device of the end device. By way of pressing the pusher in, the preloading device is preferably biased and secured again by way of pushing the spring washer over an axially thickened axle section.

The end device may be fixedly connected with the axle.

It is conceivable to manufacture the coupling piece integrally with the axle. Or else it is conceivable for the coupling piece as a separate part to be fixedly—while in particular releasably—connected with the axle. The coupling piece may for example be screwed onto the axle end or, being a hollow part, pushed onto the end and screw-coupled with the axle at a suitable, threaded portion. As a rule no rotational forces are applied to the coupling piece in use but substantially only axial forces act such that a screwed connection may be sufficiently safe.

The two-wheeler component according to the invention comprises a first dropout and a second dropout and an axle system with an axle to receive a wheel of a two-wheeler and in particular of a bicycle. A clamping mechanism having at least one tightening device and at least one end device is provided and equipped to clampingly fasten the axle received at the dropouts between the tightening device and the end device. At the tightening device a coupling device is received which is movable between an engagement position and a release position and which in the engagement position retains a coupling piece of the axle in particular form-fittingly and in the release position, releases the coupling piece.

Preferably the tightening device comprises a tightening bush at which the coupling device is received axially fixed in one direction and in the other direction, axially movable. The tightening bush comprises an external thread engaging in an internal thread connected with the dropout.

In particular is the tightening device secured to a dropout of the two-wheeler component. Particularly preferably is the two-wheeler component equipped with an axle system as it is described above.

Particularly preferably is the two-wheeler component configured as a fork frame or as a frame or e.g. as a rear wheel link fork.

BRIEF DESCRIPTION OF THE DRAWINGS

Further advantages and features of the invention are shown in the exemplary embodiments which will be described below with reference to the figures.

These show in.

DETAILED DESCRIPTION

With reference to the FIGS. 1 to 10 an exemplary embodiment of a two-wheeled vehicle 5 configured as a bicycle will be discussed below.

Figure 1:
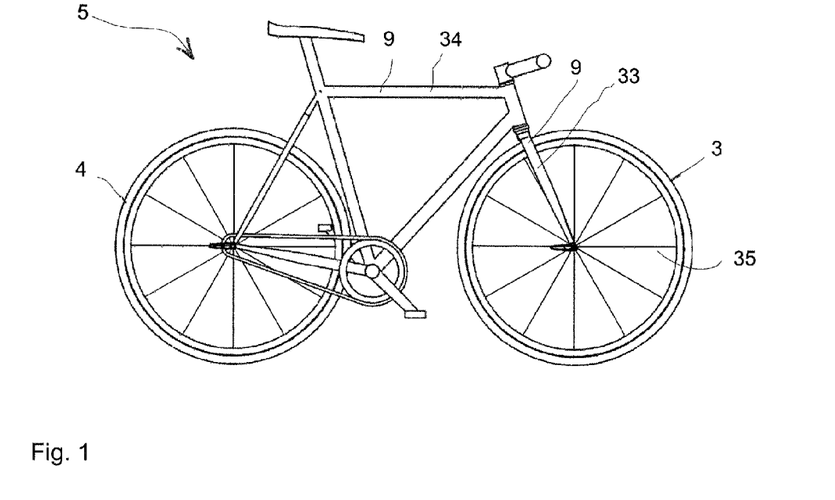
FIG. 1 a side view of an inventive bicycle.

The bicycle 5 shown in FIG. 1 in a side view comprises a front wheel 3 and a rear wheel 4 each of which is equipped with spokes 35. The front wheel 3 is retained through a two-wheeler component 9 configured as a fork 33 and the rear wheel 4 is retained at the dropouts of a two-wheeler component 9 configured as a frame 34.

Figure 2:
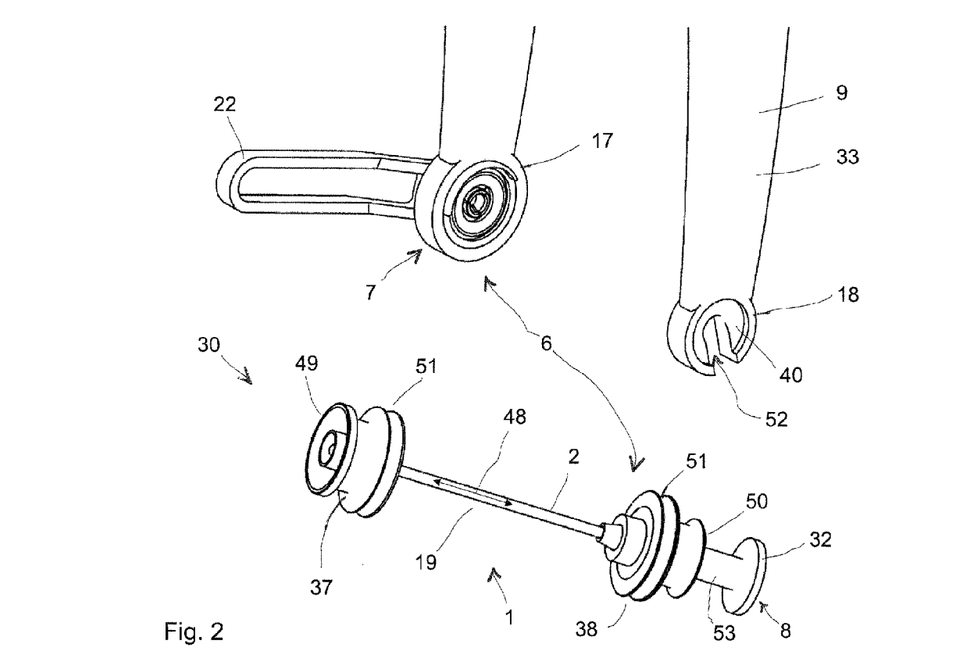
FIG. 2 a perspective illustration of an axle system and the dropouts of a bicycle component.

FIG. 2 shows in an enlarged, perspective illustration the dropouts 17, 18 of the front wheel fork 33 or of the frame 34 with the axle system 1 wherein the axle 2 has been removed from the dropouts 17 and 18. A clamping mechanism 6 serves for clamping a wheel to the two-wheeler component. The clamping mechanism 6 comprises a tightening device 7 and an end device 8.

The dropout 17 is provided with the tightening device 7 fixed to the fork. The tightening device 7 is equipped with an operating lever 22 to apply the required clamping force by rotating the operating lever 22. Since the tightening device 7 remains at the dropout 17, the axle system 1 may be preset to the corresponding distances such that wheel changes only require minimal rotation of the operating lever 22 to apply the clamping force required.

The end of the axle 2, which is inserted into the dropout 17, is provided with a stopper 37 presently comprising radially protruding flanges as sealing 51, protecting the interior of a hub 36 to be received against dirt and humidity which might enter.

The configuration allows to provide very large contact surfaces 49 and 50 at the dropouts 17 and 18 so as to allow a very rigid connection. The central axis or axis of symmetry 48 extends through the axle 2 and the axial direction 19 extends along the axle 2. The end opposite the stopper 37 is provided with an end device 8. In the presently illustrated release position 30 the pusher 32 of the end device 8 protrudes axially outwardly. With a wheel mounted, the pusher 32 lies in the recess 40 where it is retained by the surrounding material so as to retain a wheel at the bicycle component 9 without any clamping force.

For mounting a wheel 3 or 4 to a bicycle 5 the stopper 37 with the contact surface 49 is inserted into the tightening device 7 at the dropout 17 and the tubular region 53 of the end device 8 is inserted into the dropout 18 from below through the gap 52. Thereafter the pusher 32 is moved in the direction toward the dropout 18 so as to be received by the recess 40 at the dropout 18. In this position the wheel is already received at the fork 33 secure against falling off.

Figure 3:
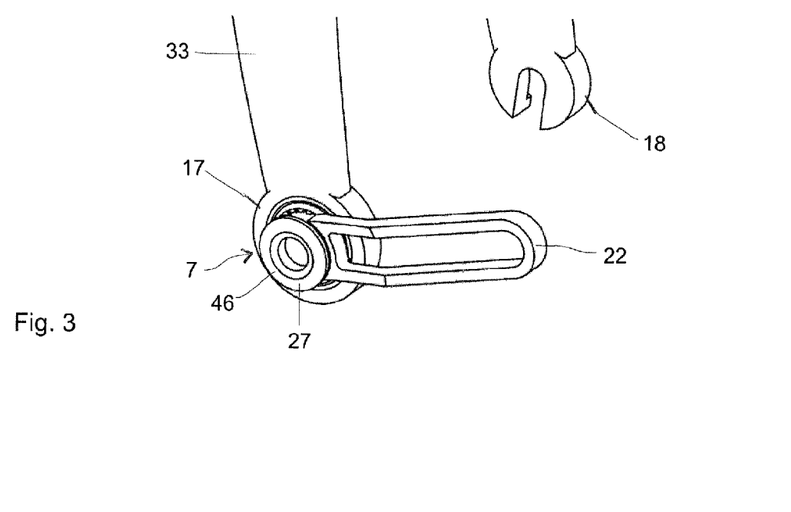
FIG. 3 another perspective view of the dropouts of a bicycle component.

FIG. 3 shows a perspective view at the other dropout 17 where one can clearly see the tightening device 7 with the operating lever 22 and the decoupling device 27, which comprises an operating knob 46.

Figure 4:
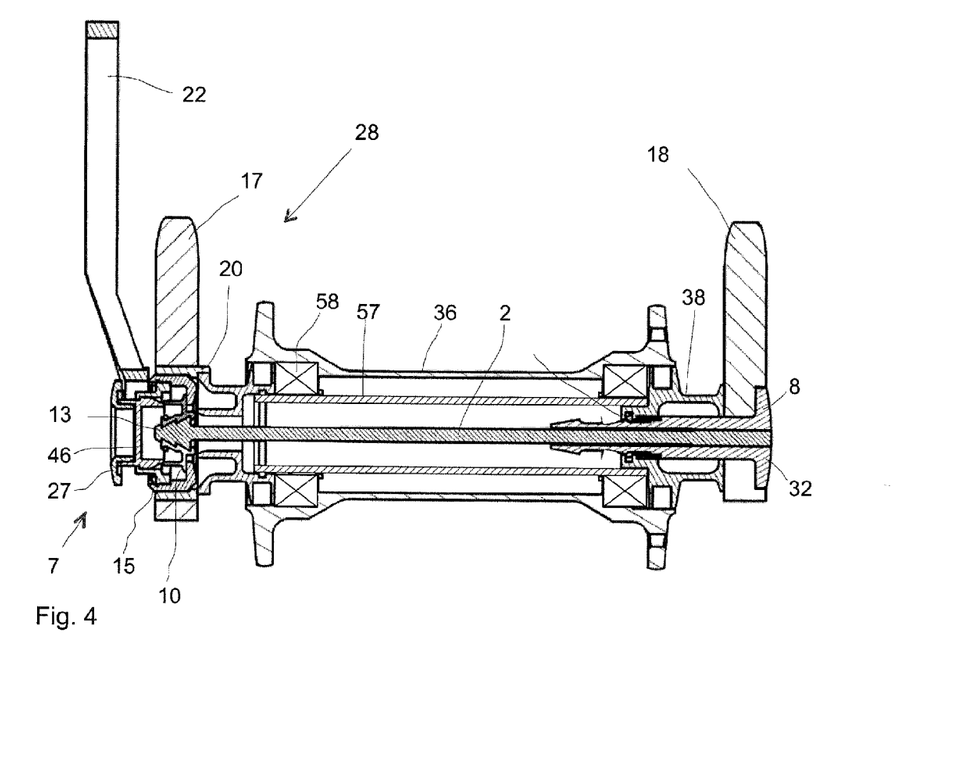
FIG. 4 a section of a hub in the engagement position received at a bicycle component.

FIG. 4 shows a cross-section of a hub 36 received at an axle system 1 in the dropouts 17 and 18 of a bicycle component 9. The hub comprises a hub axle 57 and bearings 58 to rotatably support the hub 36. The hub is in the home position and the coupling device 10 is in the engagement position 11. This is the usual operating condition of a wheel. The coupling device 10 form-fittingly encircles the coupling piece 13 configured as a clamping pin 14.

Figure 5:
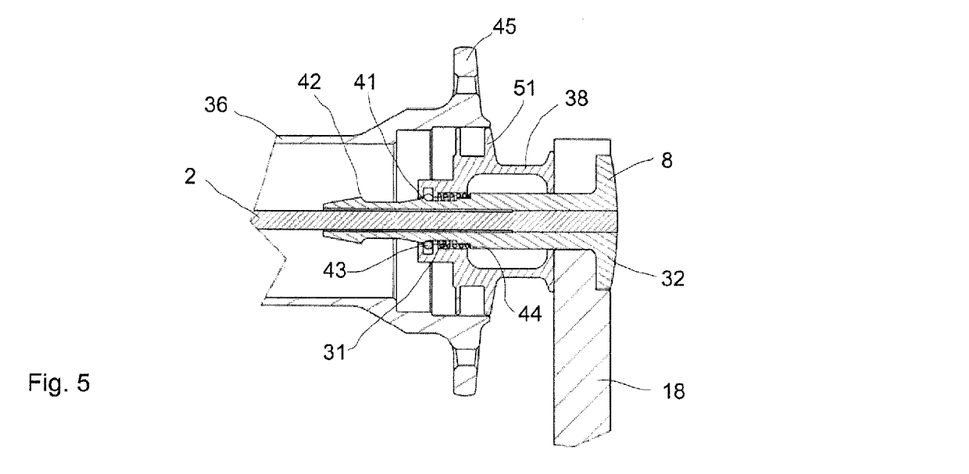
FIG. 5 an enlarged illustration of the dropout with the end device according to FIG. 4.
Figure 6:
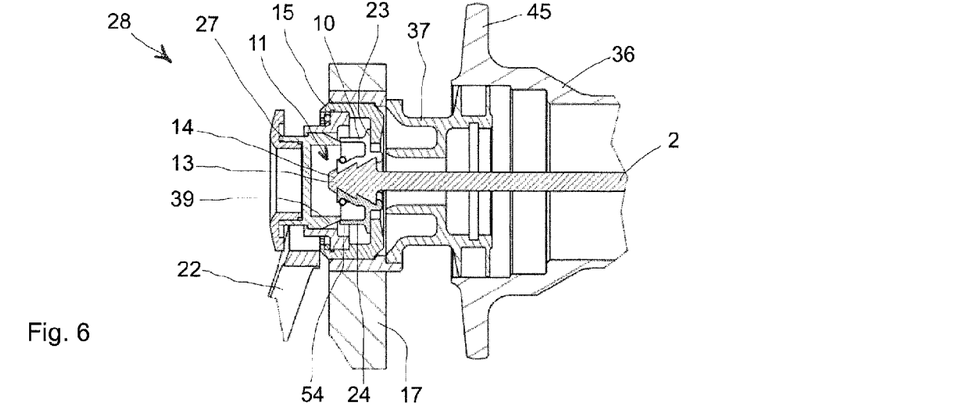
FIG. 6 an enlarged illustration of the dropout with the tightening device according to FIG. 4.

FIGS. 5 and 6 show enlarged details of the dropout 17 with the tightening device 7 and of the dropout 18 with the end device 8. In FIG. 5 the dropout 18 with the end device 8 is illustrated in an enlarged cross-section. The axle 2 extends through the hub 36.

A stopper 38 is provided at the end. A pusher 32 is provided axially outwardly at the end device 8. The end device 8 is also provided with a preloading device 31 configured as a coil spring and surrounding the axle 2. The coil spring abuts against a shoulder 44 and is retained biased in the state illustrated in FIG. 5 by means of a spring washer 43. The spring washer 43 abuts against an axial shoulder in the form of an axial thickening 41 which prohibits further axial movement of the spring washer 43 unless additional force is applied. Application of large axial force, however, allows the spring washer 43 to expand radially and thus to move across the axial thickening 41. Then the preloading device 31 is actuated which can pull the pusher 32 with the axle 2 out of the tightening device 7 if the coupling of the coupling piece 13 with the coupling device 10 is disengaged. Then the spring washer 43 is pushed further up to the next axial thickening 42 where it finally prohibits further axial movement of the preloading device 31.

The hub 36 is equipped with a hub flange 45 which serves for attaching the spokes 35 not illustrated in FIG. 5.

FIG. 6 shows the tightening device 7 in the home position 28 with the coupling device 10 being in the engagement position 11. This means that the engagement components 23 to 25 of the coupling device 10 form-fittingly encircle the coupling piece 13 configured as a clamping pin 14 and thus firmly couple the tightening device 7 with the end device 8 in the axial direction.

The coupling device 10 is received by the tightening bush 15 such that the coupling device 10 is not axially displaceable against the tightening bush 15 in the direction of the end device 8. A decoupling device 27 serves for transferring the coupling device from the engagement position 11 to a decoupling position 29 illustrated in FIG. 8. The decoupling device 27 comprises a pusher or operating knob 46 disposed thereat which serves for operating the decoupling device 27. The decoupling device 27 comprises a hollow cone 39 which interacts with a tubular region 54 of the coupling device 10 to transfer the coupling device 10 from the engagement position 11 illustrated in FIG. 6 to the release position 12 illustrated in FIG. 8. The inclined cone surface of the cone 39 engages in the tubular region 54 of the coupling device 10, urging the engagement components 23, 24 and 25 of the coupling device 10 radially outwardly over the incline so as to transfer the coupling device 10 from the engagement position 11 illustrated in FIG. 6 to the release position 12 illustrated in FIG. 8.

Figure 7:
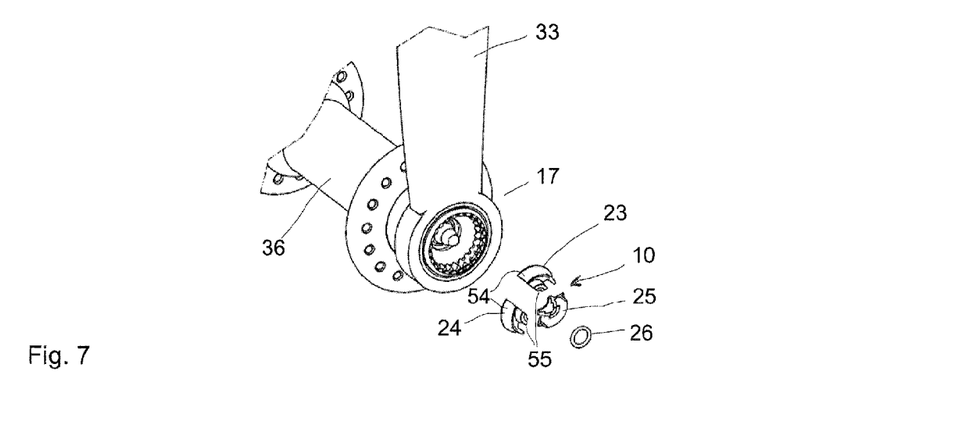
FIG. 7 a perspective view of the tightening device with the decoupling device removed.

FIG. 7 shows the dropout 17 of the fork 33 with a coupling device 10 removed, with the engagement components 23, 24 and 25 removed and drawn radially apart to illustrate their structures. One can clearly recognize the central engagement region 55 and the tubular region 54 formed by respective sections of the three engagement components 23 to 25. A spring washer or the like serves as a preloading device 26 to preload the engagement components 23 to 25 radially inwardly and thus to urge the coupling device 10 to the engagement position 11.

Figure 8:
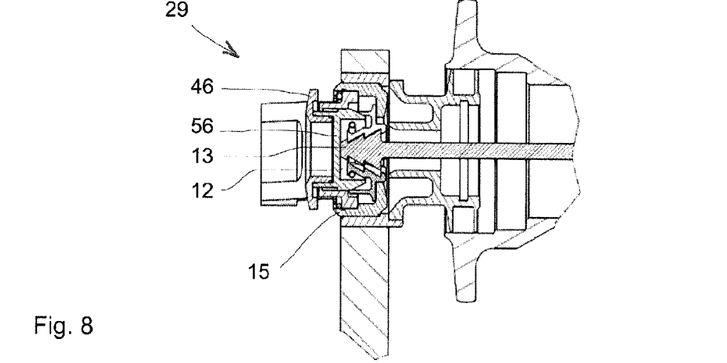
FIG. 8 the dropout with the tightening device in the decoupling position.
Figure 9:
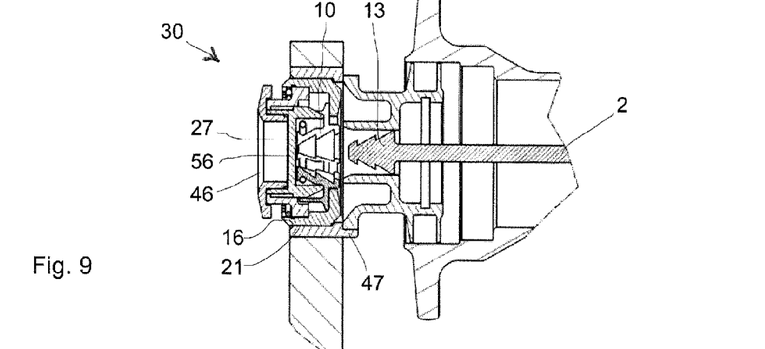
FIG. 9 the dropout with the tightening device in the release position.
Figure 10:
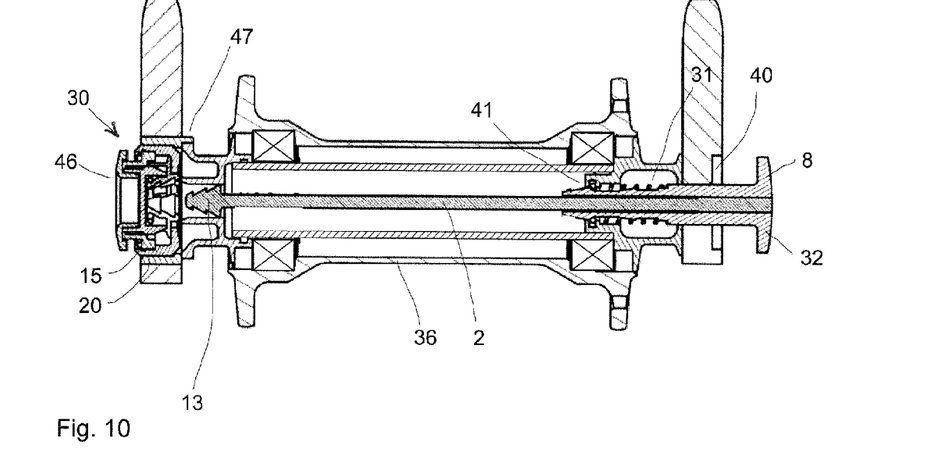
FIG. 10 an overall section of the hub in the release position received at a bicycle component.

FIG. 8 shows the start of the removal process wherein firstly the operating lever 22 was turned one half of a full rotation to reduce the clamping force. Thereafter the operating knob 46 of the decoupling device 27 is actuated and transferred from the home position 28 illustrated in FIG. 6 to the decoupling position 29 illustrated in FIG. 8. Absent a releasing of the clamping force via the operating lever 22 a transfer to the decoupling position 29 is virtually impossible though. In transferring to the decoupling position 29 the cone 39 of the decoupling device 27 presses against the tubular region 54 of the coupling device 10, urging the engagement components 22 to 25 radially outwardly so as to release the coupling piece 13 from the coupling device 10.

In this position the base 56 of the decoupling device 27 may already be closely adjacent to the coupling piece 13 of the axle 2. Further movement in the axial direction 19 towards the end piece 8 causes axial displacement of the coupling piece 13. The axial, thickened section 41 (see FIG. 5) is pushed along beneath the spring washer 43 so as to activate the preloading device 31, displacing the coupling piece 13 virtually abruptly by e.g. between 5 and 15 mm and in particular approximately 10 mm to the right, pulling it out of the tightening device 7. Thus the axle system 1 is released and a wheel 3 or 4 received at a bicycle component 9 can be removed. Prior to removal the wheel may possibly be supported on a projection or shoulder 47 of the bush 20 or the dropout 17 so as to obtain high operational comfort.

FIG. 10 again shows the release position 30 in an overall cross-section. On the right the end device 8 is illustrated where the spring of the preloading device 31 is drawn out up to the axial thickening 42 wherein the spring has pulled the coupling piece 13 out of the tightening device 7.

On the whole the present invention provides an axle system and a two-wheeler component which allow high operational comfort and which enable fast, safe, and easy wheel changes. The double-stage safeguard achieves a high level of safety since even after releasing the clamping force via the operating lever 22 the wheel is still securely received at the fork or the frame of the bicycle. Only an additional step namely, actuating the decoupling device, is required to allow removal of the wheel.

| List of reference numerals: | |
| --- | --- |
| 1 | axle system |
| 2 | axle |
| 3 | wheel |
| 4 | wheel |
| 5 | two-wheeler, bicycle |
| 6 | clamping mechanism |
| 7 | tightening device |
| 8 | end device |
| 9 | two-wheeler component |
| 10 | coupling device |
| 11 | engagement position |
| 12 | release position |
| 13 | coupling piece |
| 14 | clamping pin |
| 15 | tightening bush |
| 16 | external thread |
| 17 | dropout |
| 18 | dropout |
| 19 | axial direction |
| 20 | bush |
| 21 | internal thread |
| 22 | operating lever |
| 23 | engagement component |
| 24 | engagement component |
| 25 | engagement component |
| 26 | preloading device |
| 27 | decoupling device |
| 28 | home position |
| 29 | decoupling position |
| 30 | release position |
| 31 | preloading device |
| 32 | pusher |
| 33 | fork |
| 34 | frame |
| 35 | spoke |
| 36 | hub |
| 37 | stopper |
| 38 | stopper |
| 39 | cone |
| 40 | recess |
| 41 | thickened section |
| 42 | thickened section |
| 43 | spring washer |
| 44 | shoulder |
| 45 | hub flange |
| 46 | operating knob |
| 47 | projection |
| 48 | central axle |
| 49 | contact surface |
| 50 | contact surface |
| 51 | seal |
| 52 | slot |
| 53 | tubular region |
| 54 | tube region |
| 55 | engagement region |
| 56 | bottom |
| 57 | hub axle |
| 58 | bearing |
| 59 | |
| 60 | |

The invention claimed is:

1. An axle system, comprising: an axle for receiving a wheel of a two-wheeler and having a clamping mechanism having at least one tightening device and at least one end device, said tightening device including a decoupling device configured to transfer a coupling device having engagement components at least from an engagement position to a release position, wherein the decoupling device is configured to displace the engagement components radially outwardly, the clamping mechanism being equipped and provided to clampingly attach a wheel between the tightening device and the end device to a component of the two-wheeler with a clamping force, the clamping force being independent of a possible rotary movement of the axle.

2. The axle system according to claim 1 further comprising an operating lever for adjusting the clamping force, the operating lever and the tightening device are provided at a first end region of the axle and the end device is provided at a second end region of the axle.

3. The axle system according to claim 1 wherein at least part of the tightening device is free to rotate relative to the axle.

4. The axle system according to claim 1 wherein for tightening, at least part of the tightening device is rotated about a central axis at least parallel to the axle.

5. The axle system according to claim 1 wherein an operating lever with an eccentric member is provided.

6. The axle system according to claim 1 wherein the decoupling device is provided axially displaceable from a home position to a decoupling position and further to a release position.

7. The axle system according to claim 6 wherein the decoupling device is preloaded in the home position.

8. The axle system according to claim 6 wherein the decoupling device is suitable to axially displace a coupling piece of the axle from the decoupling position to the release position and to activate a preloading device of the end device with which the axle with the coupling piece is automatically pulled out further of the tightening device.

9. The axle system according to claim 1 the end device is fixedly connected with the axle.

10. An axle system, comprising: an axle for receiving a wheel of a two-wheeler and having a clamping mechanism having at least one tightening device and at least one end device, the clamping mechanism being equipped and provided to clampingly attach a wheel between the tightening device and the end device to a two-wheeler component, the tightening device receives at least part of a coupling device which is suitable for coupling the axle with the tightening device, wherein the coupling device is free to rotate relative to the tightening device and/or relative to the axle without affecting the clamping force when the coupling device is rotated.

11. The axle system according to claim 10 wherein the coupling device is connected with the tightening device which is movable between an engagement position and a release position and in the engagement position form-fittingly retains at least one coupling piece of the axle and in the release position releases the coupling piece.

12. The axle system according to claim 10 wherein the tightening device comprises a tightening bush with an external thread at which the coupling device is received wherein rotary movement of the tightening bush can cause axial displacement of the tightening bush and thus of the coupling device.

13. The axle system according to claim 12 wherein the tightening bush is connected with an operating lever for tightening and releasing.

14. The axle system according to claim 10 wherein the coupling device form-fittingly encircles the coupling piece in the engagement position.

15. The axle system according to claim 10 wherein the coupling device comprises at least one engagement component which in transfer from the engagement position to the release position is relocated radially outwardly.

16. The axle system according to claim 10 wherein the coupling device comprises a plurality of engagement components which in transfer from the engagement position to the release position are relocated radially outwardly.

17. The axle system according to claim 15 wherein the engagement components the coupling device are preloaded radially inwardly by means of a preloading device.

18. The axle system according to claim 10 wherein the coupling piece is fixedly though releasably connected with the axle.

19. A two-wheeler component, comprising: a first dropout and a second dropout and an axle system with an axle for receiving a wheel of a two-wheeled vehicle, including a clamping mechanism with at least one tightening device and at least one end device equipped to clampingly attach the axle received at the dropouts between the at least one tightening device and the at least one end device, the at least one tightening device receives a coupling device which is movable between an engagement position and a release position, wherein in the engagement position the coupling device form-fittingly retains a coupling piece of the axle, and wherein in the release position, the coupling device releases the coupling piece; and a decoupling device, said decoupling device is axially displaceable from a home position to a decoupling position and further to a release position, wherein the decoupling device is preloaded in the home position, wherein the tightening device comprises a tightening bush at which the coupling device is received, and wherein the tightening bush comprises an external thread engaging an internal thread of the dropout, configured to axially displace the coupling piece of the axle from the decoupling position to the release position and to activate a preloading device of an end device with which the axle with the coupling piece is automatically pulled out further of the tightening device, wherein the clamping mechanism is configured to clampingly attach a wheel between the tightening device and the end device to a two-wheeler component with a clamping force, the clamping force being independent of a possible rotary movement of the axle.

20. The two-wheeler component according to claim 19 wherein the tightening device is attached to a dropout of the two-wheeler component.

21. The two-wheeler component according to claim 19 further comprising a decoupling device that is axially displaceable from a home position to a decoupling position and further to a release position, wherein the decoupling device is preloaded in the home position, wherein the decoupling device is configured to axially displace the coupling piece of the axle from the decoupling position to the release position and to activate a preloading device of an end device with which the axle with the coupling piece is automatically pulled out further of the tightening device, wherein the clamping mechanism is configured to clampingly attach a wheel between the tightening device and the end device to a two-wheeler component with a clamping force, the clamping force being independent of a possible rotary movement of the axle.

22. The two-wheeler component according to claim 19, wherein a decoupling device is provided axially displaceable from a home position to a decoupling position and further to a release position, wherein the decoupling device is preloaded in the home position, wherein the decoupling device is suitable to axially displace the coupling piece of the axle from the decoupling position to the release position and to activate a preloading device of an end device with which the axle with the coupling piece is automatically pulled out further of the tightening device, wherein the end device comprises a pusher configured to counter a force generated by the preloading device of the end device, wherein the axle with the coupling piece is configured to be inserted into the tightening device, and wherein the component is configured as a fork or a frame.

23. An axle system, comprising: an axle for receiving a wheel of a two-wheeler and having a clamping mechanism having at least one tightening device and at least one end device, said end device including a pusher and a preloading device wherein the pusher counters a force generated by the preloading device, and wherein the clamping mechanism is equipped and provided to clampingly attach a wheel between the tightening device and the end device to a two-wheeler component, the clamping force being independent of a possible rotary movement of the axle.

* * * * *